(12) United States Patent
Clouse et al.

(10) Patent No.: US 10,253,645 B2
(45) Date of Patent: Apr. 9, 2019

(54) BLADE OUTER AIR SEAL WITH SECONDARY AIR SEALING

(71) Applicant: United Technologies Corporation, Farmington, CT (US)

(72) Inventors: Brian Ellis Clouse, Saugus, MA (US); David F. Cloud, Simsbury, CT (US); Donna Clough, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 102 days.

(21) Appl. No.: 15/103,814

(22) PCT Filed: Dec. 12, 2014

(86) PCT No.: PCT/US2014/070075
§ 371 (c)(1),
(2) Date: Jun. 10, 2016

(87) PCT Pub. No.: WO2015/089431
PCT Pub. Date: Jun. 18, 2015

(65) Prior Publication Data
US 2016/0312640 A1 Oct. 27, 2016

Related U.S. Application Data

(60) Provisional application No. 61/915,095, filed on Dec. 12, 2013.

(51) Int. Cl.
*F02C 3/04* (2006.01)
*F01D 11/08* (2006.01)
*F02C 7/28* (2006.01)
(Continued)

(52) U.S. Cl.
CPC ............ *F01D 11/08* (2013.01); *F01D 11/005* (2013.01); *F01D 11/127* (2013.01);
(Continued)

(58) Field of Classification Search
CPC ...... F01D 11/005; F01D 11/08; F01D 11/127; F01D 25/243; F02C 3/04; F02C 7/28;
(Continued)

(56) References Cited

U.S. PATENT DOCUMENTS

| 4,512,712 A | 4/1985 | Baran et al. |
| 4,925,365 A | 5/1990 | Crozet et al. |

(Continued)

FOREIGN PATENT DOCUMENTS

| DE | 10122464 C1 | 3/2002 |
| GB | 2239678 A | 7/1991 |

OTHER PUBLICATIONS

Supplementary European Search Report issued in EP Application No. 14870187.3, dated Aug. 8, 2017, 8 pages.
(Continued)

*Primary Examiner* — Jesse Bogue
(74) *Attorney, Agent, or Firm* — Cantor Colburn LLP (57) ABSTRACT

A blade outer air seal (BOAS) for a gas turbine engine according to an exemplary aspect of the present disclosure includes, among other things, a seal body having a radially inner face and a radially outer face that axially extend between a leading edge portion and a trailing edge portion. A retention flange extends from the leading edge portion and a leaf seal contacts the retention flange.

11 Claims, 4 Drawing Sheets

(51) Int. Cl.
*F01D 11/00* (2006.01)
*F01D 11/12* (2006.01)
*F01D 25/24* (2006.01)
*F04D 29/16* (2006.01)

(52) U.S. Cl.
CPC .............. *F01D 25/243* (2013.01); *F02C 3/04* (2013.01); *F02C 7/28* (2013.01); *F04D 29/164* (2013.01); *F05D 2220/32* (2013.01); *F05D 2230/237* (2013.01); *F05D 2240/35* (2013.01); *F05D 2240/57* (2013.01); *F05D 2300/10* (2013.01)

(58) Field of Classification Search
CPC .............. F04D 29/164; F05D 2220/32; F05D 2230/237; F05D 2240/35; F05D 2240/57; F05D 2300/10
See application file for complete search history.

(56) References Cited

U.S. PATENT DOCUMENTS

| | | | |
|---|---|---|---|
| 5,145,316 A | 8/1992 | Birch | |
| 5,192,185 A * | 3/1993 | Leonard | F01D 11/08 415/170.1 |
| 5,738,490 A * | 4/1998 | Pizzi | F01D 11/005 415/139 |
| 5,797,723 A | 8/1998 | Frost et al. | |
| 6,076,835 A * | 6/2000 | Ress | F01D 11/005 277/637 |
| 6,962,482 B2 * | 11/2005 | Tanaka | F01D 5/225 277/414 |
| 7,207,771 B2 * | 4/2007 | Synnott | F01D 11/08 415/173.1 |
| 9,506,367 B2 * | 11/2016 | Clouse | F01D 25/246 |
| 9,803,491 B2 * | 10/2017 | Clouse | F01D 11/005 |
| 2004/0213666 A1 | 10/2004 | Gieg et al. | |
| 2006/0083607 A1 | 4/2006 | Synnott et al. | |
| 2013/0270777 A1 | 10/2013 | Clouse | |

OTHER PUBLICATIONS

Notification of Transmittal of the International Search Report of the International Searching Authority, or the Declaration; PCT/US2014/070075; dated Mar. 24, 2015. 3 pages.
Notification of Transmittal of the Written Opinion of the International Searching Authority, or the Declaration; PCT/US2014/070075; dated Mar. 24, 2015. 7 Pages.

* cited by examiner

BLADE OUTER AIR SEAL WITH SECONDARY AIR SEALING

CROSS REFERENCE TO RELATED APPLICATION

This application is a National Phase Application of Patent Application PCT/US2014/070075 filed on Dec. 12, 2014incorporated by reference herein, which claims the benefit of and incorporates by reference herein the disclosure of U.S. Ser. No. 61/915,095, filed Dec. 12, 2013.

BACKGROUND

This disclosure relates to a gas turbine engine, and more particularly to a blade outer air seal (BOAS) that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The compressor and turbine sections may include alternating rows of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

A casing of an engine static structure may include one or more blade outer air seals (BOAS) that establish a radial flow path boundary of the core flow path. The BOAS are positioned in relative close proximity to a blade tip of each rotating blade in order to seal between the blades and the casing.

SUMMARY

A blade outer air seal (BOAS) for a gas turbine engine according to an exemplary aspect of the present disclosure includes, among other things, a seal body having a radially inner face and a radially outer face that axially extend between a leading edge portion and a trailing edge portion. A retention flange extends from the leading edge portion and a leaf seal contacts the retention flange.

In a further non-limiting embodiment of the foregoing BOAS, the leaf seal is brazed to the retention flange.

In a further non-limiting embodiment of either of the foregoing BOAS, the leaf seal is brazed to the radially outer face of said seal body.

In a further non-limiting embodiment of any of the foregoing BOAS, the leaf seal is brazed to the retention flange and to the radially outer face of the seal body.

In a further non-limiting embodiment of any of the foregoing BOAS, the leaf seal comprises a base portion, a radially outer sealing end, and a flexible arcuate portion coupling the base portion to the radially outer sealing end.

In a further non-limiting embodiment of any of the foregoing BOAS, the radially outer sealing end includes a first sealing surface and a second sealing surface.

In a further non-limiting embodiment of any of the foregoing BOAS, the second sealing surface is disposed in contact with the retention flange.

In a further non-limiting embodiment of any of the foregoing BOAS, the leaf seal is formed from sheet metal.

In a further non-limiting embodiment of any of the foregoing BOAS, the leaf seal is formed in a plurality of segments.

In a further non-limiting embodiment of any of the foregoing BOAS, the leaf seal applies a constant load on the retention flange.

A gas turbine engine according to an exemplary aspect of the present disclosure includes, among other things, a compressor section, a combustor section in fluid communication with the compressor section and a turbine section in fluid communication with the combustor section. A blade outer air seal (BOAS) is associated with at least one of the compressor section and the turbine section. The BOAS includes a seal body having a radially inner face and a radially outer face that axially extend between a leading edge portion and a trailing edge portion. A retention flange extends from the leading edge portion and a leaf seal is biased against the retention flange.

In a further non-limiting embodiment of the foregoing gas turbine engine, the leaf seal is brazed to the retention flange.

In a further non-limiting embodiment of either of the foregoing gas turbine engines, the leaf seal is brazed to the radially outer face of the seal body.

In a further non-limiting embodiment of any of the foregoing gas turbine engines, the leaf seal comprises a base portion, a radially outer sealing end, and a flexible arcuate portion coupling the base portion to the radially outer sealing end.

In a further non-limiting embodiment of any of the foregoing gas turbine engines, the radially outer sealing end includes a first sealing surface and a second sealing surface.

In a further non-limiting embodiment of any of the foregoing gas turbine engines, the second sealing surface is disposed in contact with the retention flange.

In a further non-limiting embodiment of any of the foregoing gas turbine engines, the leaf seal is formed in a plurality of segments.

In a further non-limiting embodiment of any of the foregoing gas turbine engines, a casing surrounds the BOAS, the retention flange biased against a flange of the casing.

In a further non-limiting embodiment of any of the foregoing gas turbine engines, a groove is formed in the casing, and the leaf seal is positioned within the groove.

In a further non-limiting embodiment of any of the foregoing gas turbine engines, the first sealing surface of the leaf seal is disposed in contact with the groove.

The various features and advantages of this disclosure will become apparent to those skilled in the art from the following detailed description. The drawings that accompany the detailed description can be briefly described as follows.

DETAILED DESCRIPTION

Figure 1:
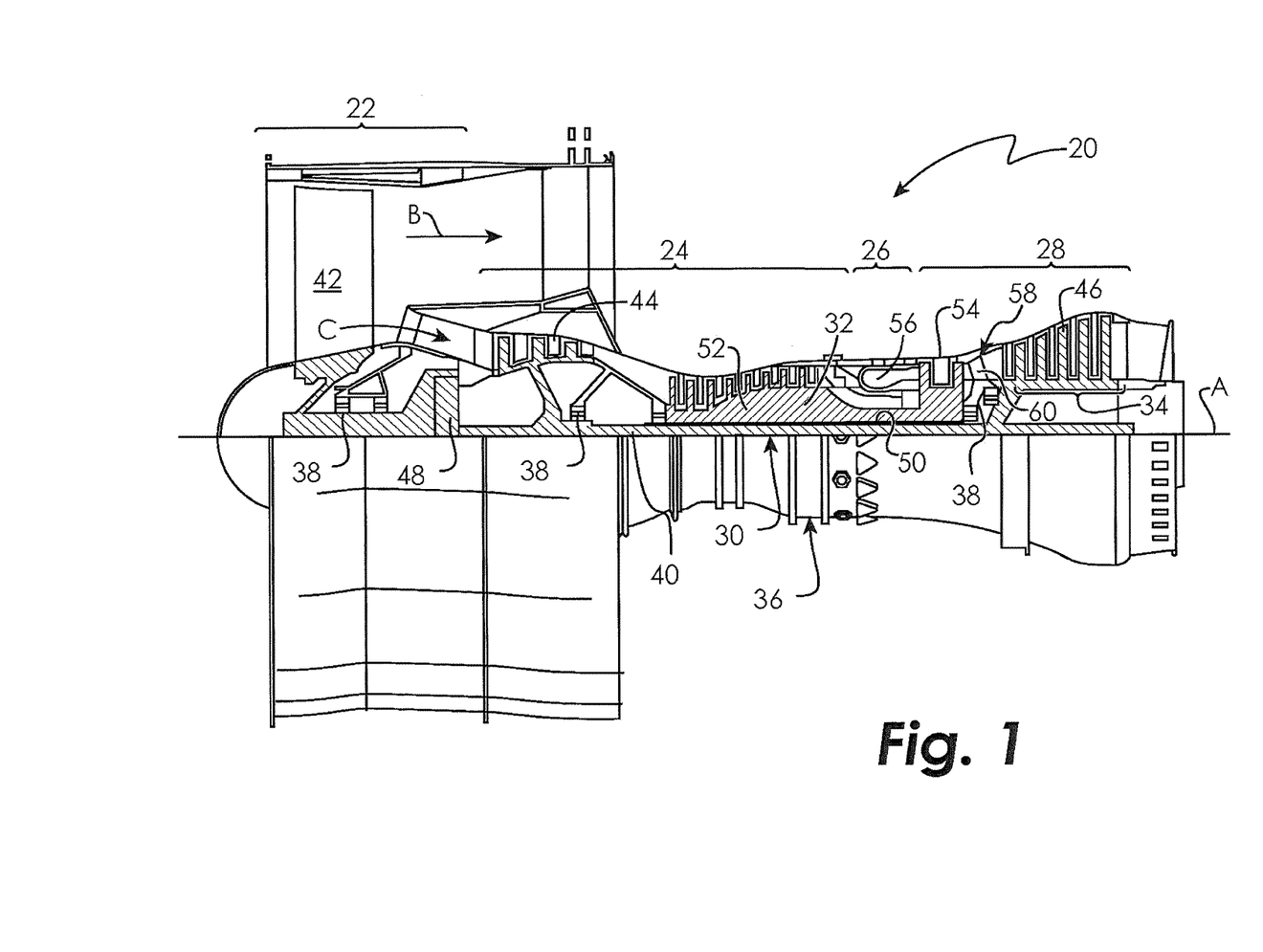
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(\text{Tram } ° \text{ R})/(518.7° \text{ R})]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy. A vane cavity 92 is disposed above the vanes 27.

This disclosure relates to blade outer air seals (BOAS) that can be positioned to surround a blade tip of each blade 25 in order to seal between the blades 25 and the engine static structure 33. The exemplary BOAS described herein provide secondary air sealing and heat shielding during all engine operating conditions, including engine shutdown.

Figure 2:
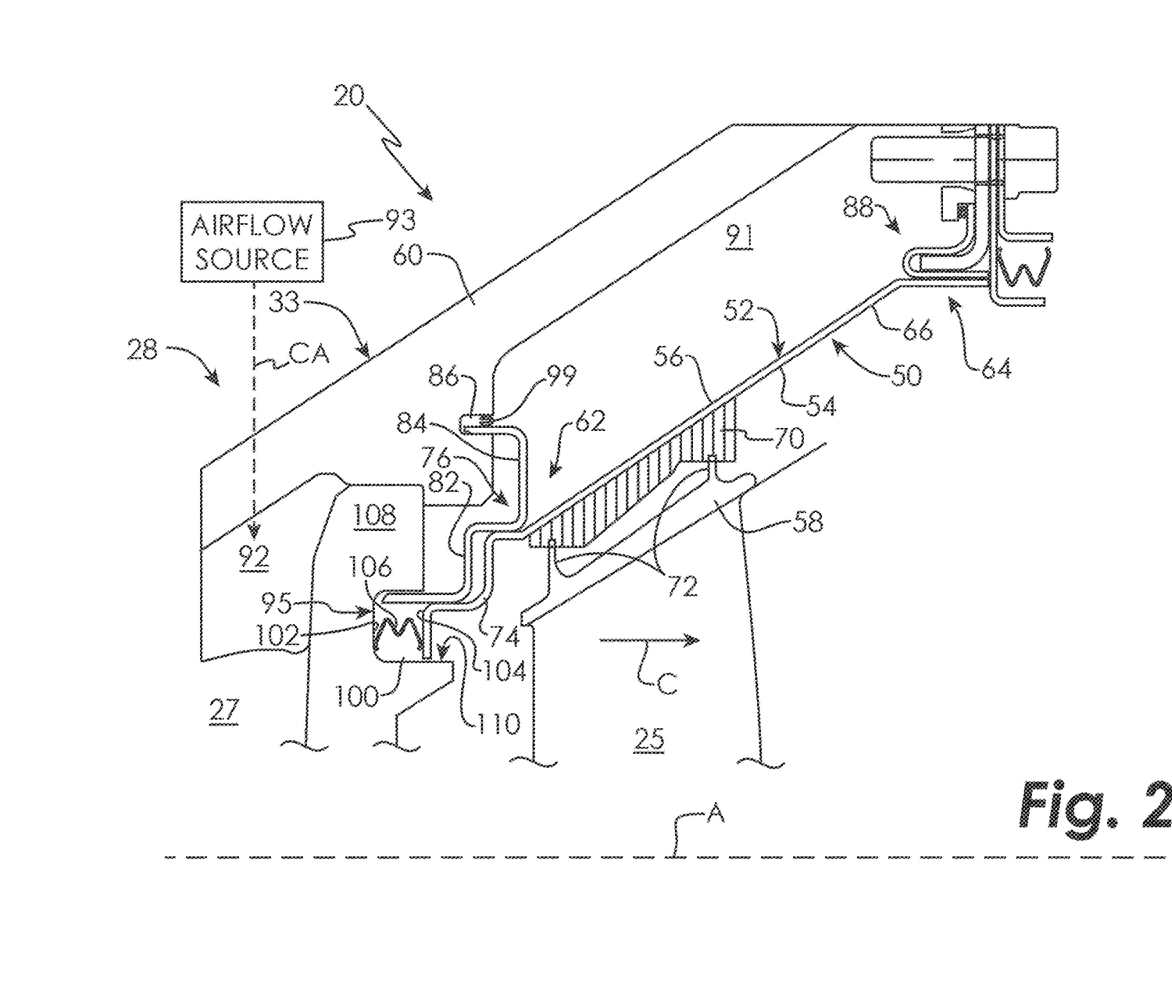
FIG. 2 illustrates a cross-sectional view of a portion of a gas turbine engine that incorporates a blade outer air seal (BOAS).

FIG. 2 illustrates one exemplary embodiment of a BOAS 50 that may be incorporated into a gas turbine engine, such as the gas turbine engine 20. The BOAS 50 of this exemplary embodiment is a segmented BOAS that can be positioned and assembled relative to a multitude of additional BOAS segments to form a full ring hoop assembly that circumscribes the rotating blades 25 of either the compressor section 24 or the turbine section 28 of the gas turbine engine 20. The BOAS 50 can be circumferentially disposed about the engine centerline longitudinal axis A. It should be understood that the BOAS 50 could embody other designs and configurations within the scope of this disclosure.

The BOAS 50 includes a seal body 52 having a radially inner face 54 and a radially outer face 56. The seal body 52 axially extends between a leading edge portion 62 and a trailing edge portion 64, and circumferentially extends between a first mate face 66 and a second mate face (not shown) opposite from the first mate face 66. The BOAS 50 may be constructed from any suitable sheet metal. Other materials, including but not limited to high temperature metallic alloys, are also contemplated as within the scope of this disclosure.

A seal 70 can be secured to the radially inner face 54 of the seal body 52. The seal 70 may be brazed or welded to the radially inner face 54, or could be attached using other techniques. In one exemplary embodiment, the seal 70 is a honeycomb seal that interacts with a blade tip 58 of a blade 25 to reduce airflow leakage around the blade tip 58. A thermal barrier coating can also be applied to at least a portion of the radially inner face 54 and/or the seal 70 to protect the underlying substrate of the BOAS 50 from thermal fatigue and to enable higher operating temperatures. Any suitable thermal barrier coating could be applied to any portion of the BOAS 50.

The BOAS 50 is mounted radially inward from a casing 60 of the engine static structure 33. The casing 60 may be an outer engine casing of the gas turbine engine 20. In this exemplary embodiment, the BOAS 50 is mounted within the turbine section 28 of the gas turbine engine 20. However, it should be understood that other portions of the gas turbine engine 20 could benefit from the teachings of this disclosure, including but not limited to, the compressor section 24.

In this exemplary embodiment, a blade 25 (only one shown, although multiple blades could be circumferentially disposed within the gas turbine engine 20) is mounted for rotation relative to the casing 60 of the engine static structure 33. In the turbine section 28, the blade 25 rotates to extract energy from the hot combustion gases that are communicated through the gas turbine engine 20 along the core flow path C. A vane 27 is also supported within the casing 60 adjacent to the blade 25. The vane 27 (additional vanes could circumferentially disposed about the engine longitudinal centerline axis A as part of a vane assembly) prepares the core airflow for the blade(s) 25. Additional rows of vanes could also be disposed downstream from the blade 25, although not shown in this embodiment.

The blade 25 includes a blade tip 58 at a radially outermost portion of the blade 25. In this exemplary embodiment, the blade tip 58 includes at least one knife edge 72 that radially extends toward the BOAS 50. The BOAS 50 establishes a radial flow path boundary of the core flow path C. The knife edge(s) 72 and the BOAS 50 cooperate to limit airflow leakage around the blade tip 58. The radially inner face 54 of the BOAS faces toward the blade tip 58 of the blade 25 (i.e., the radially inner face 54 is positioned on the core flow path C side) and the radially outer face 56 faces toward the casing 60 (i.e., the radially outer face 56 is positioned on a non-core flow path side The BOAS 50 may be disposed in an annulus radially between the casing 60 and the blade tip 58. Although this particular embodiment is illustrated in cross-section, the BOAS 50 may be attached at its mate face 66 (and at its opposite mate face) to additional BOAS segments to circumscribe associated blades 25 of the compressor section 24 and/or the turbine section 28. A cavity 91 radially extends between the casing 60 and the radially outer face 56 of the BOAS 50. The cavity 91 can receive a dedicated cooling airflow CA from an airflow source 93, such as bleed airflow from the compressor section 24, which can be used to cool the BOAS 50.

The leading edge portion 62 and the trailing edge portion 64 may include retention flanges 76, 88, respectively, for retaining the BOAS 50 to the casing 60. Although the retention flange 76 is shown positioned at the leading edge portion 62 and the retention flange 88 is shown positioned at the trailing edge portion 64, an opposite configuration is also contemplated in which the retention flange 76 is positioned at the trailing edge portion 64 and the retention flange 88 is positioned at the leading edge portion 62. One or both of the retention flanges 76, 88 may incorporate secondary air sealing features, as discussed in greater detail below.

In this exemplary embodiment, the leading edge portion 62 of the BOAS 50 includes a seal land 74 in addition to the retention flange 76. The seal land 74 and the retention flange 76 can extend from the seal body 52. In this embodiment, the seal land 74 is formed integrally with the seal body 52 as a monolithic piece and the retention flange 76 can be attached to the seal body 52, such as by brazing or welding. Alternatively, the retention flange 76 could also be formed integrally with the seal body 52 as a monolithic piece. The seal land 74 seals (relative to a vane 27) the gas turbine engine 20 and also radially supports the retention flange 76. The retention flange 76 secures the BOAS 50 relative to the casing 60 to retain the vane 27 in the radial direction.

The retention flange 76 may include a radially inner portion 82 and a radially outer portion 84. The radially outer portion 84 is engaged relative to the engine static structure 33 and the radially inner portion 82 is engaged relative to a vane 27. In this exemplary embodiment, the radially inner portion 82 is generally L-shaped and the radially outer portion 84 is generally C-shaped.

The radially outer portion 84 of the retention flange 76 is received within a groove 86 of the casing 60 to radially retain the BOAS 50 to the casing 60 at the leading edge portion 62. The radially inner portion 82 of the retention flange 76 can be received within a groove 95 of a vane segment 108 of the vane 27 to radially support the vane 27. In this exemplary embodiment, the vane segment 108 is a vane platform and the groove 95 is positioned on the aft, radially outer diameter side of the vane 27. The vane segment 108 rests against the radially inner portion 82.

The seal land 74 radially supports the retention flange 76. In other words, the retention flange 76 contacts the seal land 74 such that the vane 27 is prevented from creeping inboard a distance that would otherwise permit the vane segment 108 from being liberated from the casing 60.

The seal land 74 extends radially inwardly from the radially inner face 54 of the BOAS 50 and can contact a portion 110 of the vane segment 108 such that a pocket 100 extends between an aft wall 102 of the vane segment 108 and an upstream wall 104 of the seal land 74. A seal 106 can be received within the pocket 100 between the aft wall 102 and the upstream wall 104.

In this exemplary embodiment, the seal 106 is a W-seal. However, other seals are also contemplated as within the scope of this disclosure, including but not limited to, sheet metal seals, C-seals, and wire rope seals. The seal 106 provides secondary air sealing by substantially preventing airflow from leaking out of the cavity 91 into the core flow path C (and vice versa). The seal land 74 also acts as a heat shield by blocking hot combustion gases that may otherwise escape the core flow path C and radiate into the vane segment 108 or other portions of the vane 27.

Figure 3:
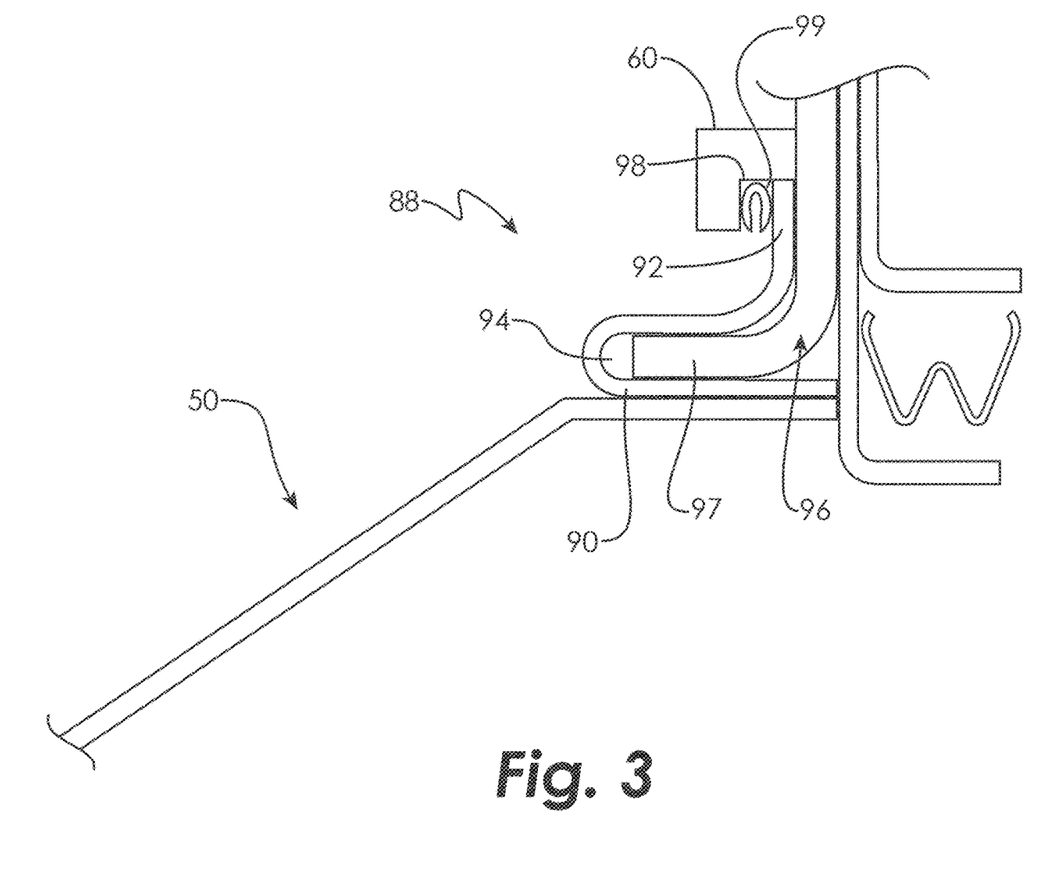
FIG. 3 illustrates a BOAS that provides secondary air sealing.

Referring to FIG. 3 (with continued reference to FIG. 2), the retention flange 88 of the BOAS 50 may include a fishmouth body 90 and an outer lip 92 that extends radially outward from the fishmouth body 90. The retention flange 88 is attached to the seal body 52 of the BOAS 50. Alternatively, the retention flange 88 is part of the seal body 52 to define a monolithic piece. The fishmouth body 90 defines a recess 94 that can receive a portion of the casing 60, such as a flange 96. In this embodiment, the flange 96 includes a bent portion 97 that extends into the recess 94 defined by the fishmouth body 90. The outer lip 92 extends into a groove 98 formed in the casing 60.

A seal 99 can be positioned within the groove 98 to bias the outer lip 92 against the flange 96. Another seal 99 could also be positioned within the groove 86 (see FIG. 2) to seal around the retention flange 76. The seal 99 may exert a constant load on the outer lip 92 to force it against the flange 96 at all times, although some relative motion may exist between the outer lip 92 and the flange 96. In one embodiment, the seal 99 is attached to the outer lip 92, such as by brazing or welding, and is compression fit inside of the groove 98. The seal 99 can also be appropriately sized to provide adequate spring force to overcome any adverse pressure differential between the cavity 91 and the core flow path C. The seal 99 provides secondary air sealing by substantially preventing airflow from the cavity 91 from leaking around the retention flange 88 and escaping into the core flow path C (or vice versa).

In another embodiment, a leaf seal 120 can be positioned within the groove 86 (see FIG. 4) to seal around the retention flange 76. The seal 120 may include a base portion 122 that is attached to the radially outer portion 84 of the retention flange 76, to the radially outer face 56 of the BOAS 50, or to both of these structures. In an embodiment, such attachment may be made by brazing, although other means of attachment may also be used. The seal 120 may further include a radially outer sealing end 124 coupled to the base portion 122 through a flexible arcuate portion 126. The radially outer sealing end 124 may include a first sealing surface 128 that engages the radially outer portion 84 of the retention flange 76. The radially outer sealing end 124 may further include a second sealing surface 130 that engages the radially outer portion of the groove 86. The seal 120 may exert a constant load on the radially outer portion 84 of the retention flange 76 to force it against the radially inner portion of the groove 86 at all times, although some relative motion may exist between the radially outer portion 84 of the retention flange 76 and the radially inner portion of the groove 86. The seal 120 therefore forms a compression fit between the groove 86 and the radially outer portion 84 of the retention flange 76. The seal 120 can also be appropriately sized to provide adequate spring force to overcome any adverse pressure differential between the cavity 91 and the core flow path C. The seal 120 provides secondary air sealing by 1) substantially reducing airflow in the vane cavity 92 from leaking around the retention flange 76 into the BOAS cavity 91 and 2) substantially reducing airflow in the core flow path C from leaking into the BOAS cavity 91.

Figure 4:
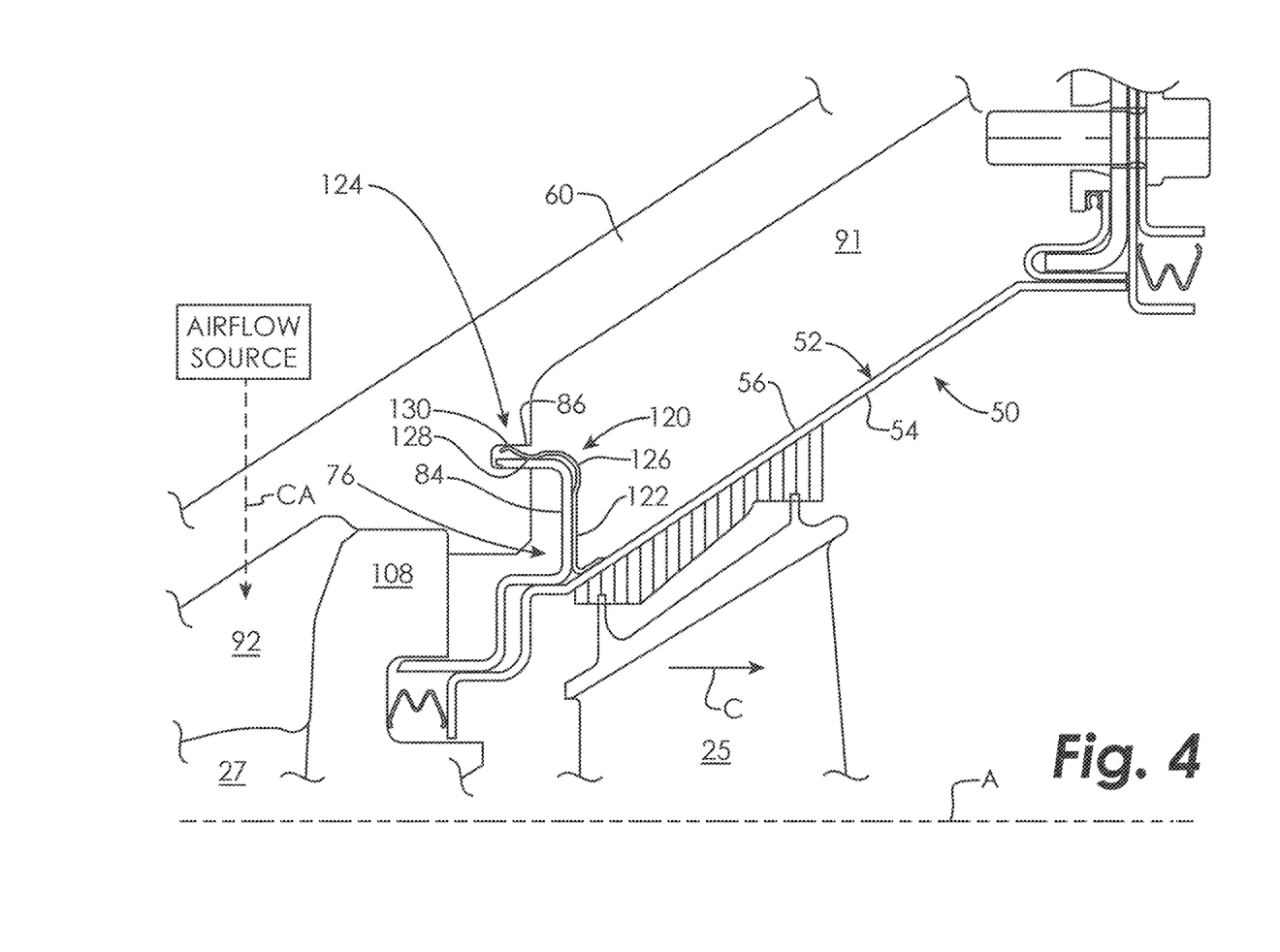
FIG. 4 illustrates a BOAS that provides secondary air sealing.

In an embodiment, the seal 120 may be formed from sheet metal or other desired material in a plurality of segments that, when joined side by side, form a substantially continuous 360 degree seal around the engine. Because the seal 120 is a spring rather than a rigid piece, it does not prevent relative motion between the BOAS 50 and the casing 60 due to, for example, differential thermal expansion. In order to reduce the frictional resistance to motion exhibited by the seal 120, the magnitude of the contact forces at the first sealing surface 128 and the second sealing surface 130 may be sized to be relatively low, since the displacement range of the seal 120 is approximately the total of the tolerances of the radially outer portion 84 of the retention flange 76 and the groove 86.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A blade outer air seal for a gas turbine engine, comprising:
    a seal body having a radially inner face and a radially outer face that axially extend between a leading edge portion and a trailing edge portion;
    a retention flange that extends from said leading edge portion; and
    a leaf seal that contacts said retention flange, said leaf seal including a base portion, a radially outer sealing end, and a flexible arcuate portion coupling the base portion to the radially outer sealing end, at least the flexible arcuate portion and the base portion disposed axially downstream of the retention flange relative to a direction of airflow along a core flow path of the gas turbine engine;
    wherein said radially outer sealing end includes a first sealing surface engaging a radially outer portion of the retention flange, the leaf seal extending in an axially upstream direction from the flexible arcute portion to the engagement of the first sealing surface with the radially outer portion of the retention flange; wherein said leaf is brazed to said retention flange and to said radially outer face of said body.

2. The blade outer air seal as recited in claim 1, wherein said radially outer sealing end includes a second sealing surface.

3. The blade outer air seal as recited in claim 2, wherein said second sealing surface is disposed in contact with a casing groove upstream of the engagement of the first sealing surface with the radially outer portion of the retention flange.

4. The blade outer air seal as recited in claim 1, wherein said leaf seal is formed from sheet metal.

5. The blade outer air seal as recited in claim 1, wherein said leaf seal is formed in a plurality of segments.

6. The blade outer air seal as recited in claim 1, wherein said leaf seal applies a constant load on said retention flange.

7. A gas turbine engine, comprising:
    a compressor section;
    a combustor section in fluid communication with said compressor section;
    a turbine section in fluid communication with said combstor section;
    a blade outer air seal associated with at least one of said compressor section and said turbine section, wherein said blade outer air seal includes:
        a seal body having a radially inner face and a radially outer face that axially extend between a leading edge portion and a trailing edge portion;
        a retention flange that extends from said leading edge portion; and
        a leaf seal biased against said retention flange, said leaf seal including a base portion, a radially outer sealing end, and a flexible arcuate portion coupling the base portion to the radially outer sealing end, at least the flexible arcuate portion and the base portion disposed axially downstream of the retention flange relative to a direction of airflow along a core flow path of the gas turbine engine;

wherein said radially outer sealing end includes a first sealing surface engaging a radially outer portion of the retention flange, the leaf seal extending in an axially upstream direction from the flexible arcute portion to the engagement of the first sealing surface with the radially outer portion of the retention flange; wherein said leaf seal is brazed to said retention flange and to said radially outer face of the said seal body.

8. The gas turbine engine as recited in claim 7, wherein said radially outer sealing end includes a second sealing surface.

9. The gas turbine engine as recited in claim 8, wherein said second sealing surface is disposed in contact with a casing groove upstream of the engagement of the first sealing surface with the radially outer portion of the retention flange.

10. The gas turbine engine as recited in claim 7, wherein said leaf seal is formed in a plurality of segments.

11. The gas turbine engine as recited in claim 7, comprising a casing that surrounds said blade outer air seal, said retention flange biased against a flange of said casing.

* * * * *